United States Patent [19]

MacDonald

[11] 4,319,346
[45] Mar. 9, 1982

[54] ACOUSTIC FREQUENCY SPECTRUM LOGGING

[75] Inventor: Clyde O. MacDonald, Houston, Tex.
[73] Assignee: Halliburton Company, Duncan, Okla.
[21] Appl. No.: 142,567
[22] Filed: Apr. 21, 1980
[51] Int. Cl.$^3$ .......................... G01V 1/40; G01V 1/30
[52] U.S. Cl. ........................................ 367/32; 367/30; 367/49; 367/65
[58] Field of Search ....................... 367/30, 32, 33, 49, 367/65, 66; 181/102; 364/402

[56] References Cited

U.S. PATENT DOCUMENTS

| | | | |
|---|---|---|---|
| 3,150,327 | 9/1964 | Taylor | 367/66 |
| 3,180,445 | 4/1965 | Schwartz et al. | 367/49 |
| 3,292,143 | 12/1966 | Russell | 367/30 |
| 3,327,805 | 6/1967 | Glazier et al. | 367/49 |
| 3,697,937 | 10/1972 | Ingram | 367/49 |
| 4,046,220 | 9/1977 | Glenn | 367/30 |
| 4,114,721 | 9/1978 | Gleen | 367/32 |
| 4,217,659 | 8/1980 | Glenn | 367/30 |

FOREIGN PATENT DOCUMENTS

| | | | |
|---|---|---|---|
| 2283449 | 1/1974 | France | 367/49 |
| 461397 | 7/1969 | U.S.S.R. | 367/32 |
| 361277 | 8/1969 | U.S.S.R. | 367/32 |

OTHER PUBLICATIONS

Chaney et al., "Some Effects of Frequency . . . Logs", 4/66, pp. 407-411, Journ. of Petro. Tech.

*Primary Examiner*—Nelson Moskowitz
*Attorney, Agent, or Firm*—John H. Tregoning; William J. Beard

[57] ABSTRACT

A method for developing an acoustical well log which displays the frequency content of a broad spectrum acoustical signal by discrete windows of the frequency spectrum, the final display being developed concurrently with the taking of the log and being shown with respect to depth. The method employs a spectrum analyzer and, in a single receiver embodiment, a correction circuit for compensating for attenuation introduced by the communication cable from the well-logging sonde to the surface where the recordings are produced. A two receiver embodiment develops and displays the frequency content as amplitude differences at a plurality of frequencies, automatically compensating for cable attenuation.

7 Claims, 5 Drawing Figures

ACOUSTIC FREQUENCY SPECTRUM LOGGING

BACKGROUND OF THE INVENTION

1. Field of the Invention

This invention pertains to acoustical well logging and more specifically to the development of an acoustical well log where the detected reflections are displayed in accordance with frequency response.

2. Description of the Prior Art

Acoustic well-logging employs in an electronic package or sonde lowered and raised using a cable operating in a borehole, an electro-mechanical transducer transmitter and a similar receiver or receivers vertically spaced apart therefrom. A receiver detects the returning acoustical impulses resulting from the operation of the transmitter and provides a signal suitable for revealing information about the adjacent casing, borehole and formation therebeyond.

Typically, the transducer transmitter is cycled or pulsed at a rate of many times per second, such as at 20 pps. Although recording is sometimes done in the sonde, it is usual for the detected or received impulses to be transmitted up a suitable communication-line part of the cable supporting the sonde for processing and displaying or recording at the surface contemporaneously with the development of the detected signal, such recording producing a permanent record for later evaluation.

Log information can be of tremendous utility; however, there is a constant effort in the industry to develop different types of logs, to refine the development of logs, and to improve the display and interpretation of logs. The main purpose of this on-going effort is a result of the inability to optimize the potentially tremendously valuable information that logs contain. This inability is a result of the errors that occur in log development, errors in their recording and errors in their interpretation, thereby distorting or obscuring the useful information. These errors are introduced by numerous conditions including, but not limited to, the conditions of the transmission path for the developed information, interference of transmitted signals with each other and conditions in the borehole and its environment.

Although with laborious analysis, many acoustical logs including various distortions and apparently obscured data can be processed to yield most of their valuable information, it has been difficult and therefore quite expensive to achieve such processing. Moreover, such processing is usually done after the recording act. If it were available immediately with the development of the log, this time-saving effect would be of itself a tremendously valuable result.

The normal acoustic log is developed from the production of an electro-mechanical signal which produces a wave front into the adjacent borehole and the formation beyond, normally using a transducer excited by a sine wave or pulses. A receiver operating in conjunction therewith detects and produces a mechanical-electrical signal which is proportional to the transmitted wave as changed in character by the environment intervening between the transmitter and the receiver. This resulting waveform is then displayed and/or recorded. The primary information has traditionally been in the amplitude of the recorded waveforms.

An advancement in the art of interpreting acoustic logging information known as microseismographics introduced the concept of eliminating some of the detected frequency spectrum where distortions were great, both at low and high frequencies, and integrating the resulting waveforms. Hence, the higher amplitude portions of the waveforms having the quickest rise and fall rates produced certain information when displayed in this integrated fashion that were not evident in the original form. This technique is described in U.S. Pat. No. 3,314,498, Anderson, et al. Related logging systems are also described in U.S. Pat. Nos. 3,302,165 and 3,393,404, also Anderson, et al., all of which are incorporated herein by reference for all purposes.

Another improvement of acoustic well-logging in the prior art was the use of complex pulses for exciting the transmitter transducer, such pulses comprising a plurality of different signal frequencies. The use of complex pulsing is described in an article appearing in the April, 1966 Journal of Petroleum Technology entitled "Some Effects of Frequency Upon the Character of Acoustic Logs", pages 407–411, by P. E. Chaney, Jr., C. W. Zimmerman and W. L. Anderson, which is incorporated herein by reference for all purposes. By experience it has been found that some frequencies transmitted and produced certain revealing detection results better than other frequencies. Hence, the character of the acoustic log could be enhanced by using those frequencies that produced the most revealing results.

However, heretofore it has not been recognized that there is useful logging information that is contained in the frequency content of the received signals that is not contained in the amplitude content of the same received signals. As previously mentioned, it is desirable to transmit signals that result in the most revealing received signals and to process such received signals to eliminate extraneous and interfering elements from the log. To do this, utilizing the useful information included in the frequency content of the logging signal has resulted in a new type of well log. In a preferred display format, data is displayed for convenient analysis by its content at various frequency "windows".

Therefore, it is a feature of the present invention to provide an improved acoustical logging of a borehole by displaying the received results in accordance with its frequency content.

It is another feature of the present invention to provide an improved acoustical logging of a borehole by performing spectrum analysis on detected acoustical signals as they are developed and displaying the frequency information in association with depth information.

It is still another feature of the present invention to provide an improved acoustical logging of a borehole wherein the acoustical information is transmitted to the surface for displaying and/or recording by correcting the received signals for attentuation differences at the various frequencies and then analyzing the signal by frequency content.

It is yet another feature of the present invention to provide an improved acoustical logging of a borehole by developing, by frequency content, two signals from spaced apart receivers and displaying the amplitude difference at a plurality of frequencies in association with depth information.

SUMMARY OF THE INVENTION

The present invention employs fairly standard components commonly employed in acoustic well logging in a procedure for developing a unique log for displaying information in a novel manner. In a first embodiment, the instrument package or sonde containing the electro-mechanical transmitting transducer and vertically spaced apart mechanical-electrical receiver transducer detector operates in conjunction with a signal over a broad spectrum. The electro-mechanical transducer included in the transmitter is preferably excited by an electrical signal in the form of repetitive complex pulses comprising frequencies over a wide range. The acoustical impulses detected by receiver transducer are converted to electrical energy and are transmitted to the surface via a line in the support cable for the package. These impulses are then broken down into a predetermined number of frequency segments or windows by a spectrum analyzer or other appropriate discriminator. In addition, these electrical impulses are corrected by a frequency compensating amplifier or other correcting circuit for frequency attenuation introduced by the cable so as to restore the signals to their appropriate relative amplitude response condition at the time of response. This correction can be done either before or after the spectrum analyzer or other discriminator. The signal for each frequency segment above a predetermined amplitude threshold is displayed on a common graph next to other similar signals and with respect to the logging positions in the borehole at which the signals were created as logged in conventional fashion. Both the individual traces of the individual frequency "windows" and the overall variable density appearance of the log reveal information not previously available in the prior art.

In a second embodiment, the instrument package includes a transmitting transducer and two receivers. The receivers each produce a signal suitable for frequency discrimination as in the case of the receiver for the first embodiment. By subtracting the results of the second receiver from the first, there is developed an amplitude difference for a plurality of frequencies, one for each spectrum analyzer pair of channels. This composite signal is logged with respect to the logging position in the borehole at which the signals were created. Two additional advantages of the second embodiment with respect to the first is that the formation which is logged is narrowed and tends to be generally that formation which lies physically between the receivers. Further, since cable attenuation is substantially the same for each of the receiver signals transmitted to the surface, subtracting the two automatically corrects the results without special need for a cable-correcting circuit for each of the signals.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is noted, however, that the appended drawings illustrate only typical embodiments of the invention and are therefore not to be considered limiting of its scope, for the invention may admit to other equally effective embodiments.

In the drawings.

DESCRIPTION OF THE PREFERRED EMBODIMENTS

Figure 1:
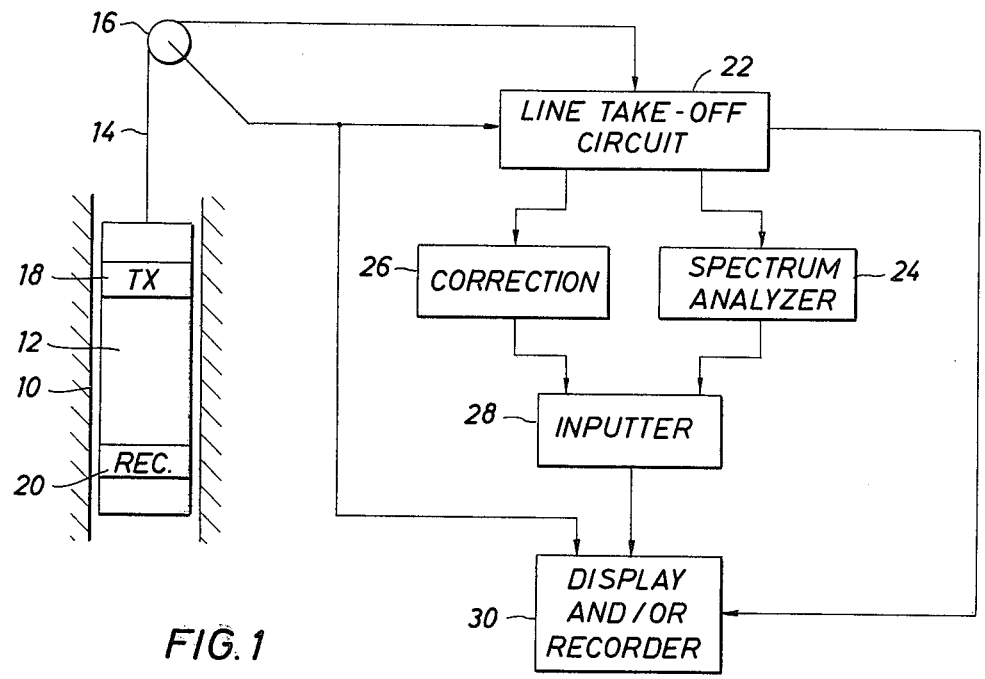
FIG. 1 is a simplified block diagram of a first embodiment of the present invention useful for developing a well log in accordance with the present invention.

Now referring to the drawings and first to FIG. 1, a portion of a borehole 10 is shown in which an instrument package 12 including an acoustical tool is shown lowered therein by way of a logging cable 14. The acoustic tool is lowered and raised within the borehole by way of a drive system 16. Logging cable 14 includes power transmission and communication lines as well as support lines for the acoustical tool.

In the production of an acoustical well log using the acoustic tool, power and control signalling are provided by way of the logging cable to excite the transmitting transducer 18 in the top part of the tool, which signals are received or detected by the transducer receiver 20 portion in the tool at a position vertically spaced apart from and below the transmitter. The environment of the casing, adjacent borehole and the formation cause effects in the receive signal which are eventually recorded in accordance with the description presented hereinafter to produce the well logs in accordance with the present invention.

The received impulses following conversion to electronic signals are communicated up the logging cable to a line take-off circuit 22. Such circuit is conventional and includes means for reproducing the electronic signal at the detector only as modified by the characteristics of the communication line between the receiver and circuit 22. For example, circuit 22 may include detectors, demultiplexers and the like and may also include filters for removing power and control frequencies.

The output of circuit 22 is connected to spectrum analyzer 24, which may be of any conventional type suitable for separating the wide band frequency spectrum supplied thereto into component parts. Typically, such an analyzer discriminates and produces an output for each window or channel which is viewed indicative of the component content of the frequency within the window. Typically, a spectrum analyzer useful in the present invention would include on the order of 400 channels in a frequency range of d.c. to 25 kHz. The rms amplitude value of a window or channel frequency is the most conventional measure of frequency content, although average amplitude or other measures of frequency content can also be employed, if desired.

The window outputs from the spectrum analyzer are corrected for attenuation caused by the length of the logging cable to the location of signal development. The correction information is supplied by correction circuit 26 and is developed in a manner explained hereinafter. The output of the correction circuit is supplied via inputter 28 with the output of spectrum analyzer 24, which produces a corrected output to display and/or recorder 30. A trigger input is applied from take-off circuit 22 in conventional fashion to synchronize recorder 30. A signal from drive system 16 to recorder 30 provides the depth indication marks for the recorder.

Figure 3:
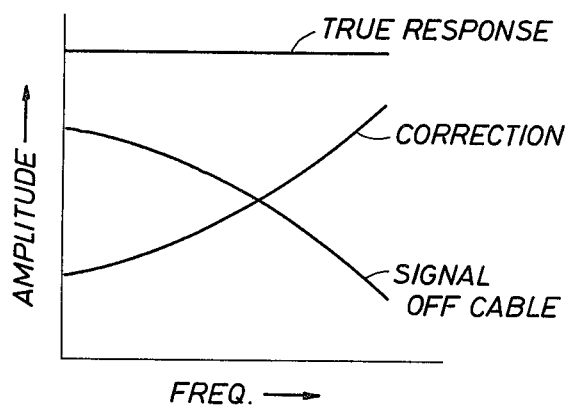
FIG. 3 is a graph useful in explaining a frequency correction feature present in the first embodiment of the present invention.

Now turning to FIG. 3, a graph is shown of typical cable attenuation effects on cable-transmitted signals over a broad frequency spectrum. It may be seen that over the frequency band of operation, the cable loss for the higher frequencies as charted on the graph are greater than for the lower frequencies. Therefore, the correction circuit is designed to amplify or otherwise compensate by augmentation or otherwise, the higher frequency signals to a greater extent than the lower frequency signals so as to produce a flat, true response curve as shown on the top line in FIG. 3.

The correction circuit can achieve its operation in one of several ways. One convenient way is by use of a frequency compensating amplifier for boosting the outputs from the spectrum analyzer. Such amplifier amplifies the higher frequencies more than the lower frequencies in accordance with a curve dependent on the attenuation characteristics of the communication line and the length thereof. That is, for a shorter length, the amplifier curve would tend to be flatter than for a longer length. A connection to cable drive system 16 via line take-off circuit 22 is used to control the amplification correction applied from correction circuit 26 to inputter 28 with the output of spectrum analyzer 24 to achieve the flat true response results discussed above. Obviously, for shorter cable lengths, less correction is required.

Another, and preferred, correction circuit merely produces a signal that is non-uniform in amplitude or intensity over the frequency spectrum of operation. Such signal would have a higher amplitude level at higher frequencies than at lower frequencies. The exact amount of amplitude level is determined by an internal memory correction circuit as previously determined to be required for the characteristics of the particular cable and the length of such cable. The length control mechanism again is derived from cable drive system 16, which operates a shift register and other electronic memory components in conventional fashion.

Although the correction circuit is shown following the spectrum analyzer it can be located either immediately before the spectrum analyzer or even before the line take-off circuit, if desired.

In any event, for each window, the corrected signal above a predetermined threshold produces a displayable and/or recordable series of logs.

Figure 2:
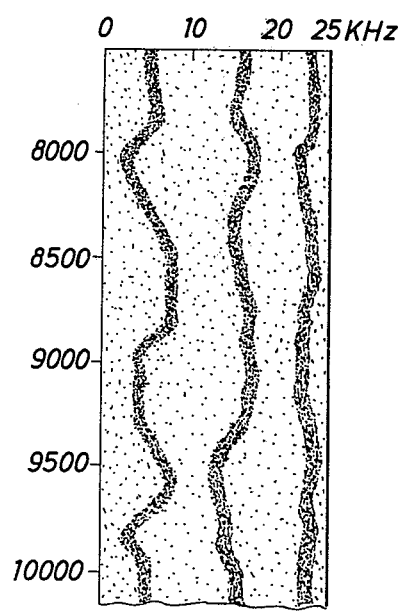
FIG. 2 is a pictorial representation of a log developed in accordance with the present invention.

Now referring to FIG. 2, an illustration of a typical log in accordance with the present invention is shown. This log is referred to as a variable density log and is similar in appearance to amplitude acoustical logs in the prior art. To produce such a log, a beam of an oscilloscope moves across the face in swept fashion, a left-hand position representing the lowest frequency and a right-hand position representing the highest frequency. As the beam is swept, the consecutive outputs from the 400 or so channels of the spectrum analyzer are applied as bias voltage for modulating the intensity of the beam. A high frequency content for a particular channel is represented by a relatively large voltage above a predetermined threshold and results in a darker intensity on the face of the oscilloscope. A camera scanned past the face of the oscilloscope produces a permanent record of the type shown in FIG. 2. Note that the signals from the spectrum analyzer continuously vary the beam output and therefore one channel actually overlaps the next and one channel also becomes virtually indistinguishable from its neighbors.

As the acoustic tool is raised and the transmitting transducer is excited, typically by pulsing the transducer at 20 pps with a complex pulse including a plurality of frequencies, the receiver results in a recorded signal in the fashion shown.

Please note that the log which is developed in FIG. 2 is logged with respect to specific locations within the well bore as indicated by the divisions given along the left-hand margin. These divisions may be developed by mechanical or electromechanical means connected to the drive system. That is, for each incremental raising of the logging cable, a signal is produced by a cam or otherwise to provide a bench mark indicative of a borehole location as provided for recording. It is a result of this same cam operation that produces a signal to correction circuit 26 for selecting its electronic operation as discussed above. The means for creating a logging division indication or creating a log as a function of depth in the manner described is old in the art and therefore is not further specifically described herein.

It may be noted that at some locations, the content of the traces practically fades into nonexistence, which means that for a particular frequency window the signal may not be above the selected predetermined threshold.

It is also quite apparent that the frequency content for the different channels or windows may be quite different from one another, indicating that there is much information in the frequency content of the signal which may not be apparent from only recording the overall amplitude of the signal in the prior art fashion. Furthermore, the overall appearance of the traces when viewed together in close proximity with one another gives variable density information which is not apparent from any of the individual channel traces, were they produced singly.

Although many electrical, electro-mechanical and mechanical components are conventionally available and can be used for the various component elements of the system just described, Gen Rad 2515 Spectrum Analyzer is suited for use as spectrum analyzer 24 and Raytheon SAR-097A Spectrum Analysis Recorder can be used as recorder 30.

Figure 4:
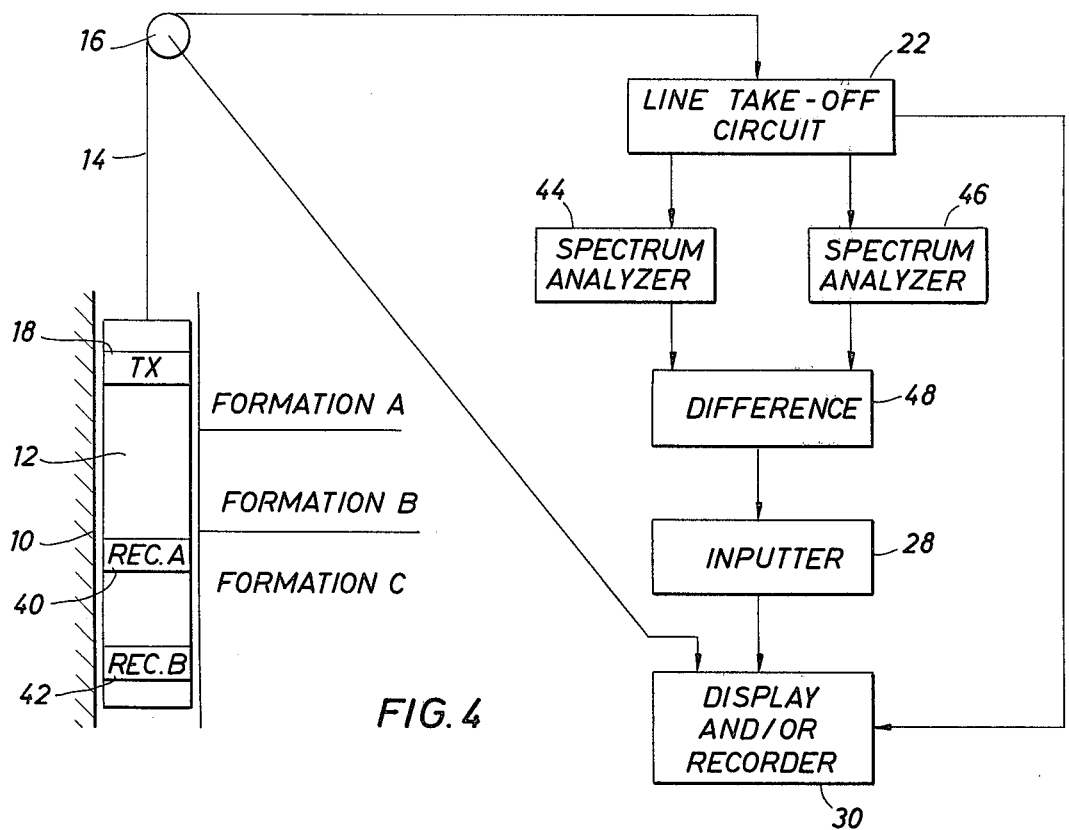
FIG. 4 is a simplified block diagram of a second embodiment of the present invention useful for developing a well log in accordance with the present invention.

Now referring to FIG. 4, an alternate or second embodiment of the invention is shown, like numbers being used for like components to the embodiment shown in FIG. 1. The acoustical tool shown is this embodiment includes a transmitter 18 and a first transducer receiver 40 vertically spaced apart and below the transmitter and a second transducer receiver 42 vertically spaced apart and below receiver 40. Both receivers 40 and 42 are similar to receiver 20 discussed above.

Although there may be formation A and formation B in the vicinity of the tool between the transmitter and receiver 40 which differs from formation C located between receivers 40 and 42, the technique employed in the second embodiment provides information with respect to this formation C, and therefore is more discriminating in viewing a narrower formation than the embodiment of the invention shown in FIG. 1.

The received impulses, following conversion to electronic signals are communicated up logging cable 14 to a line take-off circuit 22, as before. Actually, there are two sections of this circuit for reproducing a first electronic signal representative of the acoustic signal detected by receiver 40, as modified by cable attenuation, and for reproducing a separate second electronic signal representative of the acoustic signal detected by receiver 42, again as modified by cable attenuation.

These first and second signal are then respectively applied to spectrum analyzers 44 and 46, to produce two plurality of frequency channel outputs, as described above for the spectrum analyzer shown in FIG. 1. Each respective channel from spectrum analyzer 46 is then subtracted from its counterpart from spectrum analyzer 44 in difference circuit 48 to produce amplitude difference voltages at a plurality of frequencies, one for each spectrum analyzer pair of channels.

The output from difference circuit 48 is applied through inputter 28 to display and/or recorder 30 with position input data derived from drive 16, as for the previous embodiment, to be displayed and/or recorded in device 30, again as discussed for the previous embodiment. A synchronizing trigger is applied from take-off circuit 22 to display and/or recorder 30.

It should be noted that the appearance of the log is similar to that shown in FIG. 2, but actually is an amplitude difference log at a plurality of frequencies rather than a direct frequency log. However, both logs are useful in showing the frequency content, howbeit different aspects thereof, of the received and detected signals.

Figure 5:
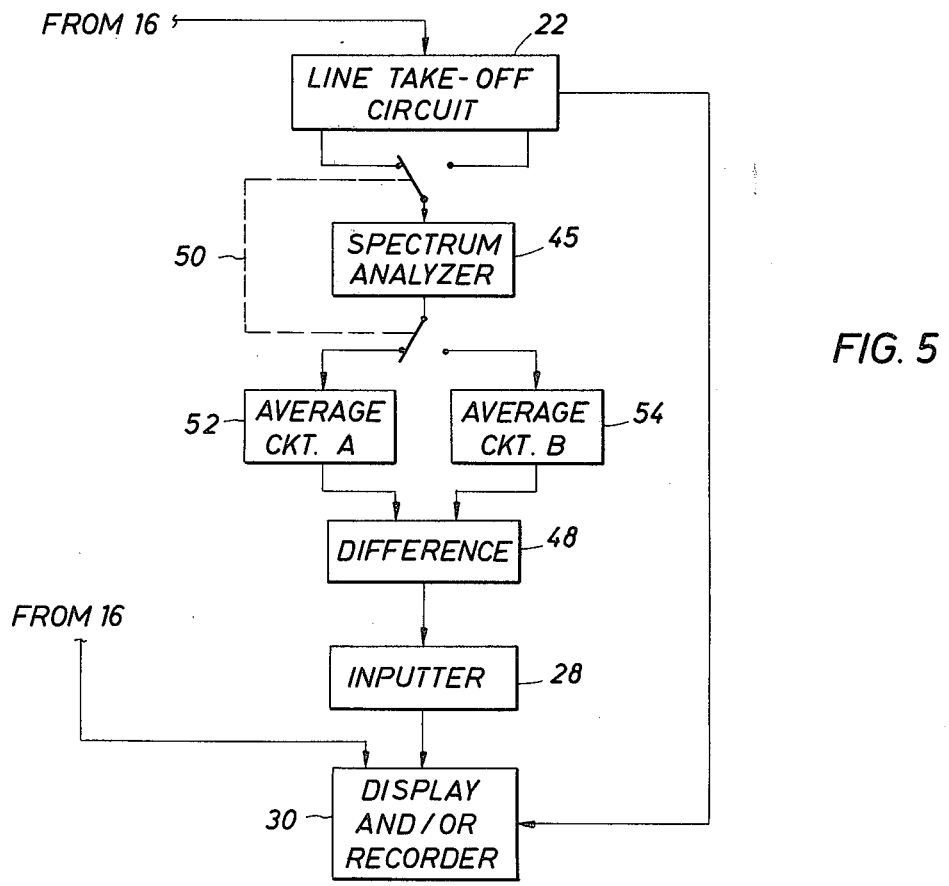
FIG. 5 is a simplified partial block diagram of an alternate second embodiment of the present invention to that shown in FIG. 4.

FIG. 5 shows an alternative to the FIG. 4 embodiment. In this arrangement, the two outputs respectively representing receivers 40 and 42 from take-off circuit 22 are time shared through a first set of contacts of cyclically operating electronic switch 50 to spectrum analyzer 45. This permits the use of only a single spectrum analyzer in the place of the two employed in FIG. 4.

A second set of contacts of electronic switch 50 alternately directs the corresponding outputs from spectrum analyzer 45 respectively corresponding to the respective inputs to averaging circuits A (52) and B (54). These averaging or integrating circuits each produce an average value for each channel output applied thereto over a period of time assuring a smoother result than operating without such averaging circuits. These respective plurality of output channels are applied to a difference circuit 48, which is similar in operation to the indentical circuit shown in FIG. 4. From there, the development and production of the output on display and/or recorder 30 is identical with the FIG. 4 embodiment.

While particular embodiments of the invention have been shown and described, it will be understood that the invention is not limited thereto, since many modifications may be made and will become apparent to those skilled in the art.

What is claimed is:

1. The method of acoustically logging a borehole using an instrument sonde sized and adapted for passage through a well borehole, said sonde having an acoustic signal transmitter and first and second broad frequency spectrum acoustic receivers, said sonde being lowered and raised in the borehole by an armored well logging cable supporting said sonde and providing a transmission path to the surface from the receivers, which comprises recording the depth of the sonde in a well borehole,
generating an acoustic signal from the transmitter included in the sonde to cause acoustical signal arrivals at the receivers,
generating a first electrical signal representative of the received acoustical signal at said first receiver and transmitting said first electrical signal to the surface by way of conductors of said logging cable,
generating a second electrical signal representative of the received acoustical signal at said second receiver and transmitting said second electrical signal to the surface by way of conductors of said logging cable,
separating said first electrical signal into multiple components by frequency to produce a first plurality of selectable signals, each of which is representative of the amplitude of a small frequency band within the broad frequency spectrum of the first receiver,
separating said second electrical signal into multiple components by frequency to produce a second plurality of selectable signals, each of which is representative of the amplitude of the same small frequency bands within the broad frequency spectrum of the second receiver as said corresponding first plurality of selectable signals,
subtracting corresponding ones of each of said first and second plurality of selectable signals to produce a plurality of amplitude difference signals corresponding to a plurality of frequencies covering substantially the entire broad frequency spectrum of said receivers and
recording said plurality of selectable difference signals in correlation with respect to the sonde depth log.

2. The method in accordance with claim 1, wherein only first and second frequency separated signals above a predetermined threshold level are recorded in correlation with respect to the sonde depth log.

3. The method in accordance with claim 1, wherein the plurality of difference signals are logged in close proximity to produce a viewable composite log.

4. The method in accordance with claim 3, wherein the amplitude of each of said difference signals modulates a swept oscilloscope beam to produce a variable density recording log.

5. The method in accordance with claim 1, wherein at least one acoustic frequency spectrum analyzer is employed for separating said first and second representative electrical signals.

6. The method in accordance with claim 5, wherein the same spectrum analyzer employed for separating said first electrical signal is time shared for separating said second electrical signal.

7. The method in accordance with claim 1, and including the steps of
averaging said separated first electrical signals over a period of time, and
averaging said separated second electrical signals over a period of time, prior to subtracting corresponding ones of said selectable signals.

* * * * *